United States Patent
Zhou

(10) Patent No.: US 7,760,492 B2
(45) Date of Patent: Jul. 20, 2010

(54) SHELL AND DISPLAY DEVICE USING THE SAME

(75) Inventor: Si-Wei Zhou, Suzhou (CN)

(73) Assignee: Qisda Corporation, Taoyuan County (TW)

( * ) Notice: Subject to any disclaimer, the term of this patent is extended or adjusted under 35 U.S.C. 154(b) by 257 days.

(21) Appl. No.: 12/149,863

(22) Filed: May 9, 2008

(65) Prior Publication Data

US 2009/0027838 A1    Jan. 29, 2009

(30) Foreign Application Priority Data

Jun. 15, 2007    (TW) ............................. 96121907 A

(51) Int. Cl.
G06F 1/16    (2006.01)
(52) U.S. Cl. ............... 361/679.21; 345/582; 248/125.1; 396/419
(58) Field of Classification Search .................. 345/582, 345/173, 8; 463/46; 349/58; 248/125.1, 248/295.11, 231.91, 168, 200; 361/679.21, 361/679.26, 679.01, 679.05, 679.02, 679.27, 361/679.07; 396/419, 535, 318; 312/223.2, 312/223.3, 138.1
See application file for complete search history.

(56) References Cited

U.S. PATENT DOCUMENTS

| | | | |
|---|---|---|---|
| 2004/0162146 A1* | 8/2004 | Ooto | 463/46 |
| 2006/0290835 A1* | 12/2006 | Sakuma | 349/58 |
| 2007/0216702 A1* | 9/2007 | Takahashi et al. | 345/582 |

* cited by examiner

Primary Examiner—Hung V Duong

(57) ABSTRACT

A shell and a display device using the same are provided. The shell is disposed at the display device. The shell includes a frame, a clamping element, a fastening element and an elastic element. The frame has a first surface, a second surface and a hole. The first surface is opposite to the second surface. The first surface and the second surface are penetrated by the hole. The clamping element is inserted into the hole. An end of the clamping element is positioned at a side of the first surface, and the other end of the clamping element is positioned at a side of the second surface. The fastening element is disposed at the side of the second surface and connected to the clamping element. The elastic element is used for providing the clamping element with an elastic force toward the first surface.

20 Claims, 4 Drawing Sheets

SHELL AND DISPLAY DEVICE USING THE SAME

This application claims the benefit of Taiwan application Serial No. 96121907, filed Jun. 15, 2007, the subject matter of which is incorporated herein by reference.

BACKGROUND OF THE INVENTION

1. Field of the Invention

The invention relates in general to a shell and a display device using the same, and more particularly to a shell capable of positioning an object and a display device using the same.

2. Description of the Related Art

Normally, when an office worker needs to leave a message to someone else or to write down something to remind oneself, a notepaper would be used. The notepaper is usually placed at an obvious place so that the notepaper would not be forgotten.

Generally speaking, a display device or a keyboard is the place easy to be noticed by the office worker. However, when the notepaper is directly placed on a keyboard or a desk without being fixed, the notepaper is easily lost due to environment factors such as a blast of wind.

Furthermore, although some independent clamping devices are applied to fix a notepaper, the clamping devices are still easy to be forgotten due to the location of the clamping devices. Sometimes the clamping devices are even lost.

SUMMARY OF THE INVENTION

The invention is directed to a shell and a display device using the same. A frame, a clamping element, an elastic element and a fastening element work together to position an object onto the shell.

According to a first aspect of the present invention, a shell is provided. The shell is disposed at a display device. The shell includes a frame, a clamping element, a fastening element and an elastic element. The frame has a first surface, a second surface and a hole. The first surface is opposite to the second surface, and the first surface and the second surface are penetrated by the hole. The clamping element is inserted into the hole. An end of the clamping element is positioned at a side of the first surface, and the other end of the clamping element is positioned at a side of the second surface. The fastening element is disposed at the side of the second surface and connected to the clamping element. The elastic element is used for providing the clamping element with an elastic force toward the first surface.

According to a second aspect of the present invention, a display device is provided. The display device includes a display element and a shell. The display element is disposed in the shell. The shell includes a frame, a clamping element, a fastening element and an elastic element. The frame has a first surface, a second surface and a hole. The first surface is opposite to the second surface, and the first surface and the second surface are penetrated by the hole. The clamping element is inserted into the hole. An end of the clamping element is positioned at a side of the first surface, and the other end of the clamping element is positioned at a side of the second surface. The fastening element is disposed at the side of the second surface and connected to the clamping element. The elastic element is used for providing the clamping element with an elastic force toward the first surface.

The invention will become apparent from the following detailed description of the preferred but non-limiting embodiments. The following description is made with reference to the accompanying drawings.

DETAILED DESCRIPTION OF THE INVENTION

Figure 1:
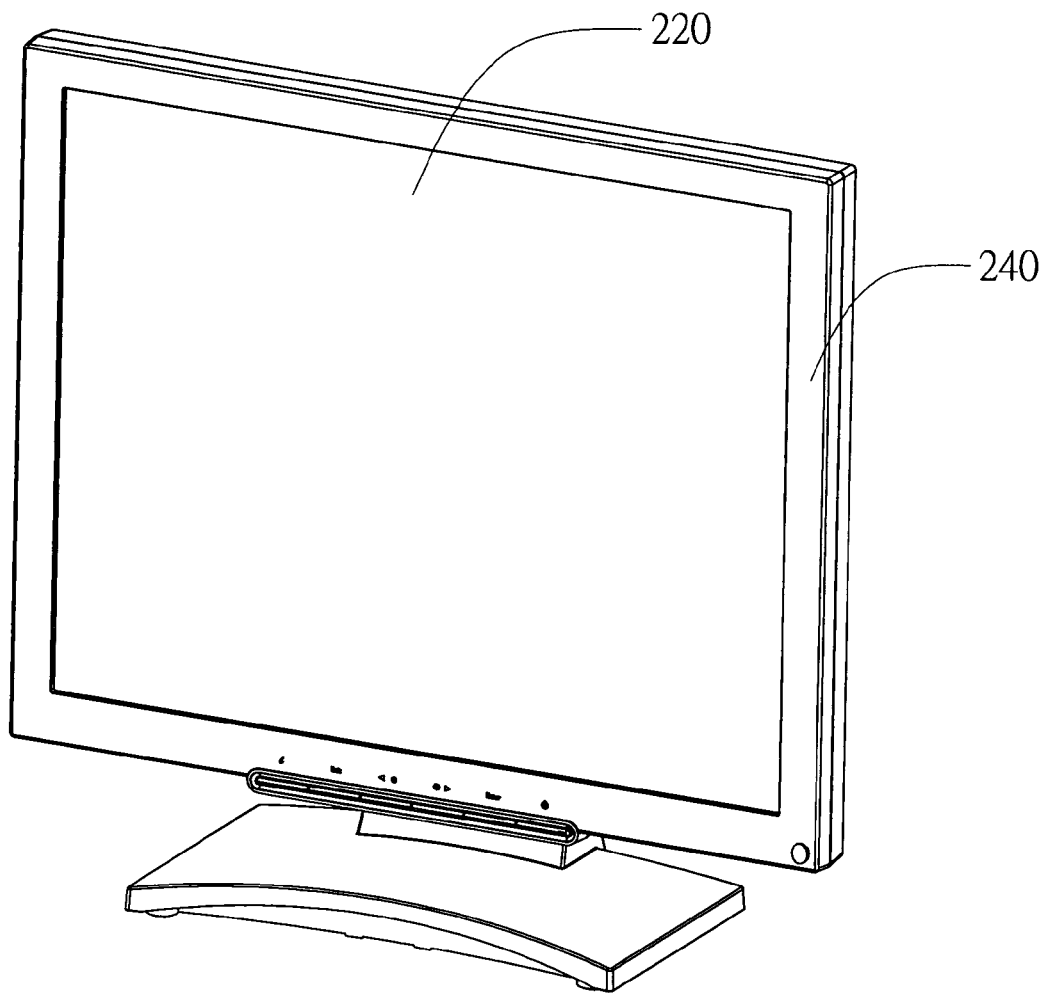
FIG. 1 illustrates a display device according to a preferred embodiment of the present invention.

Referring to FIG. 1, a display device according to a preferred embodiment of the present invention is illustrated. The display device 100 includes a display element 220 and a shell 240. The display element 220 is disposed in the shell 240.

Figure 2A:
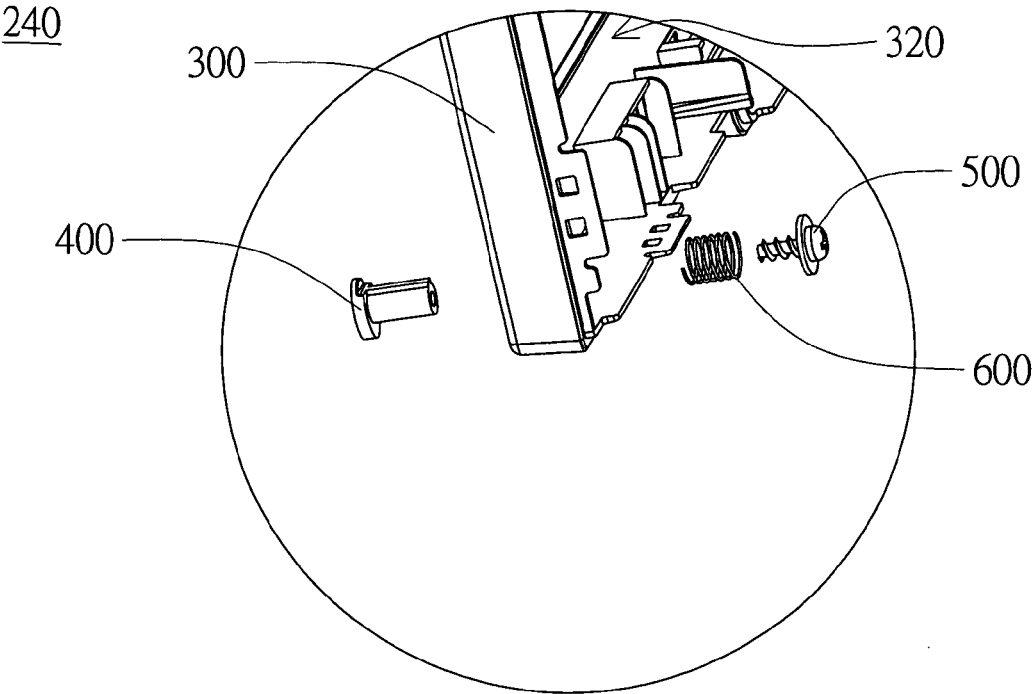
FIG. 2A illustrates an exploded view of the shell in FIG. 1.
Figure 2B:
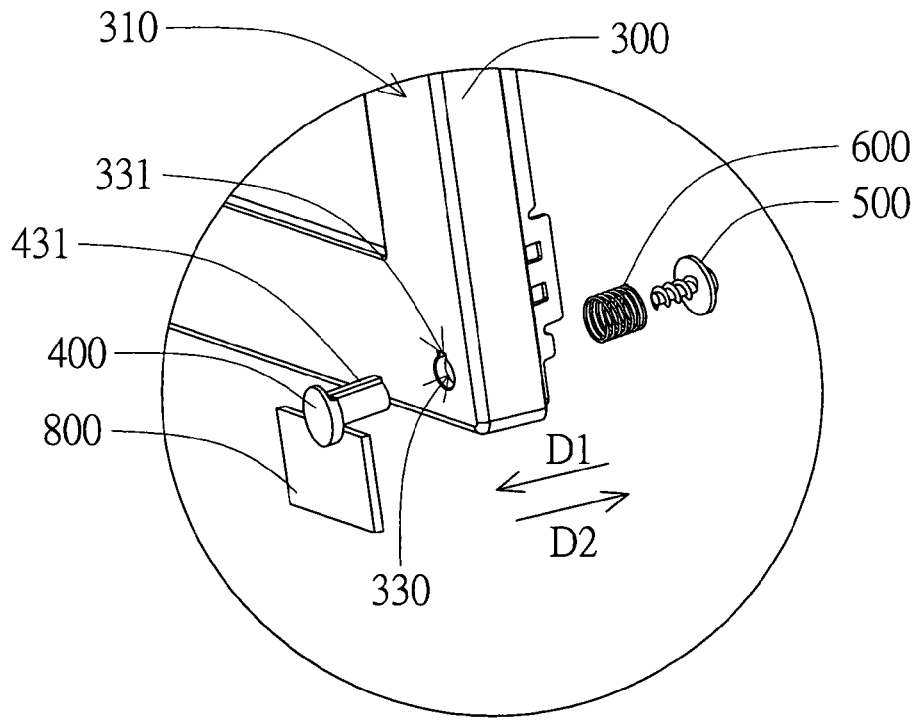
FIG. 2B illustrates another exploded view of the shell in FIG. 1.

Referring both to FIG. 2A and FIG. 2B, FIG. 2A illustrates an exploded view of the shell in FIG. 1, and FIG. 2B illustrates another exploded view of the shell in FIG. 1. The shell 240 includes a frame 300, a clamping element 400, a fastening element 500 and an elastic element 600. The frame 300 has a first surface 310, a second surface 320 and a hole 330. The first surface 310 is opposite to the second surface 320, and the first surface 310 and the second surface 320 are penetrated by the hole 330.

Figure 3A:
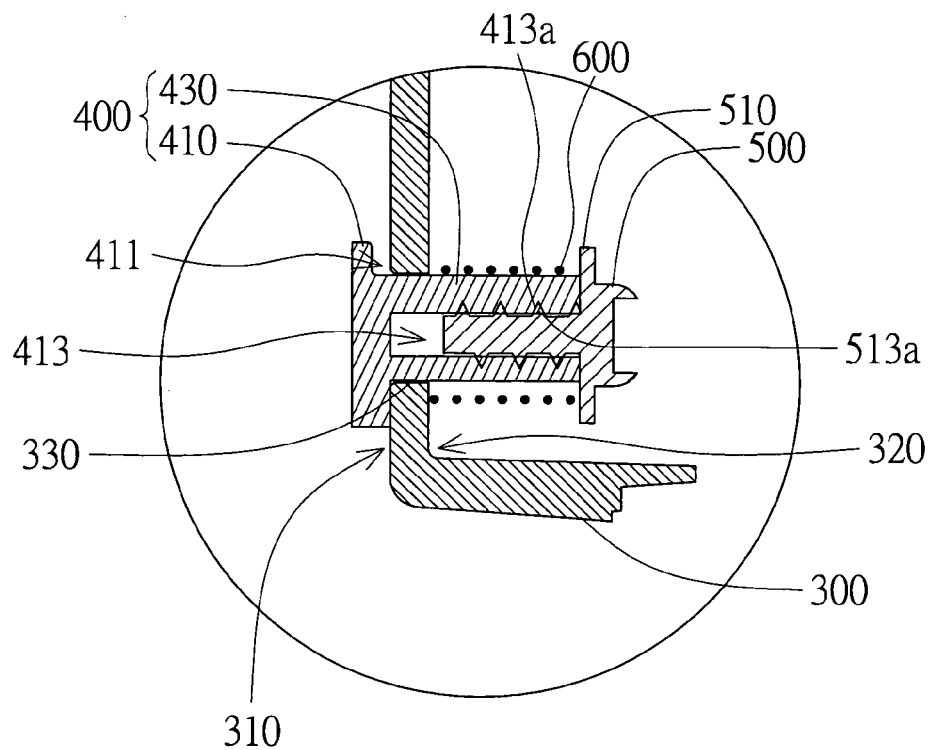
FIG. 3A illustrates cross-sectional view of the shell in FIG. 1.

Referring to FIG. 3A, a cross-sectional view of the shell in FIG. 1 is illustrated. The clamping element 400 is inserted into the hole 330. When the clamping element 400 is inserted into the hole 330, an end of the clamping element 400 is at a side of the first surface 310, and the other end of the clamping element 400 is at a side of the second surface 320. The fastening element 500 is disposed at the side of the second surface 320 and connected to the clamping element 400. The elastic element 600 is used for providing the clamping element 400 with an elastic force toward the first surface 310.

As shown in FIG. 2B, when a user needs to position an object 800 onto the shell 240, the user can hold and move the clamping element 400 toward a direction D1. Next, the object 800 is placed between the clamping element 400 and the frame 300. Then, the object 800 is positioned onto the shell 240 by the clamping element 400 via the elastic force provided by the elastic element 600.

The elastic force provided by the elastic element 600 is toward the first surface 310, that is, a direction D2. Furthermore, the object 800 is, for example, a notepaper. Accordingly, the object 800 (the notepaper) can be positioned onto the shell 240 of the display device 100.

As shown in FIG. 3A, the clamping element 400 of the shell 240 has a body 410 and a protruding column 430. The body 410 is positioned at the side of the first surface 310 of the frame 300. The body 410 is, for example, a flat plate, so that the body 410 flatly contacts the frame 300 without being damage due to the external collision. In addition, a user can design a pattern on the surface of the body 410 for making the body 410 more appealing. For example, a trademark of the manufacturer can be disposed on the body 410.

In addition, the body 410 has a holding part 411, so that a user can hold the clamping element 400 more easily. The holding part 411 can be, for example, a recess at an edge of the body 410, and the recess faces the first surface 310. Although the holding part 411 is a recess in the present embodiment, the invention is not limited thereto. The holding part 411 can be a ring pull or another structure, so that a user can hold the clamping element 400 easily.

The protruding column 430 protrudes from the body 410 and is inserted into the hole 330. As shown in FIG. 2B, the hole 330 and the protruding column 430 respectively have a groove 331 and a rib 431. The rib 431 is engaged with the groove 331 to prevent the clamping element 400 from rotating in the hole 330. Or, the protruding column 430 can be, for example, a prism, and the cross-sectional shape of the hole 330 corresponds to that of the protruding column 430. As a result, the clamping element 400 would not rotate in the hole 330.

Moreover, as shown in FIG. 3A, the protruding column 430 has a containing hole 413 having an internal thread surface 413a. One end of the fastening element 500 has an external thread surface 513a. The fastening element 500 is fastened in the containing hole 413 and the internal thread surface 413a is connected to the external thread surface 513a, so that the clamping element 400 is coupled to the fastening element 500.

The other end of the fastening element 500 has a block 510. The cross-sectional width of the body 410 and the cross-sectional width of the block 510 are larger than that of the hole 330 at least in one direction. Preferably, the cross-sectional width of the clamping element 400 and the cross-sectional width of the fastening element 500 are larger than that of the hole 330 at least in one direction. Therefore, the clamping element 400 and the fastening element 500 would not pass through the hole 330 and separated from the frame 300.

The elastic element 600 is disposed at the side of the second surface 320 and surrounds the protruding column 430. One end of the elastic element 600 is disposed at the second surface 320, and the other end of the elastic element 600 is disposed at the fastening element 500.

The elastic element 600 is, for example, a spiral spring. However, the invention is not limited thereto. The elastic element 600 can be other kinds of elements providing the elastic force. Moreover, although the other end of the elastic element 600 is disposed at the fastening element 500, the invention is not limited thereto. One end of the elastic element 600 can be disposed at the first surface, and the other end of the elastic element 600 can be disposed at the clamping element 400.

Figure 3B:
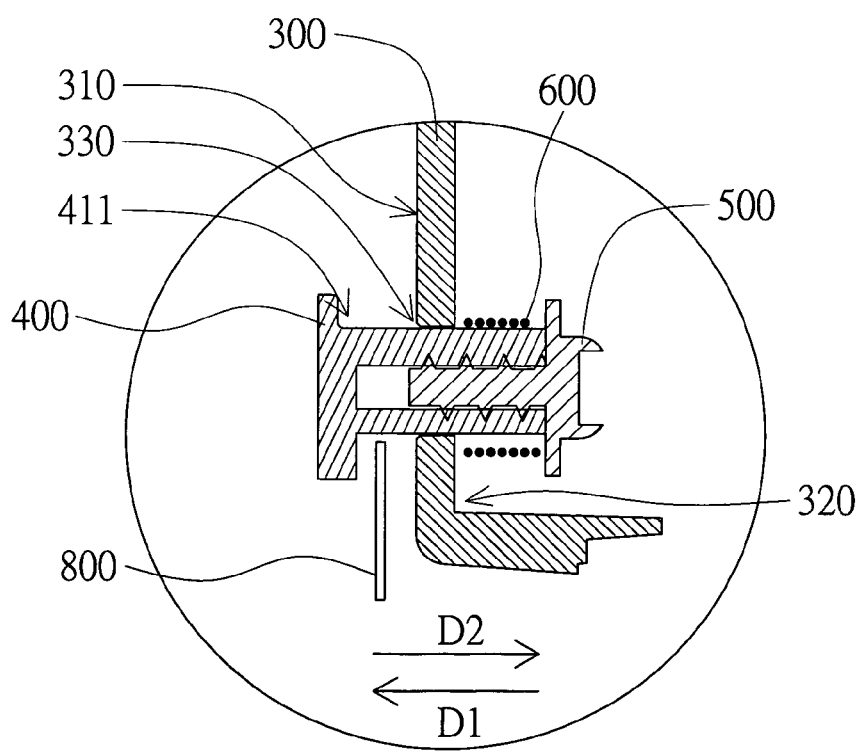
FIG. 3B illustrates the object positioned by the clamping element in FIG. 3A.

Referring to FIG. 3B, the object positioned by the clamping element in FIG. 3A is illustrated. When a user needs to position the object 800 onto the shell 240, the user can hold the holding part 411 of the clamping element 400 and moves the clamping element 400 toward the direction D1. Next, the object 800 is placed between the clamping element 400 and the frame 300. Then, the object 800 is positioned onto the shell 240 by the clamping element 400 via the elastic force. The elastic force provided by the elastic element 600 is toward the direction D2.

Figure 4:
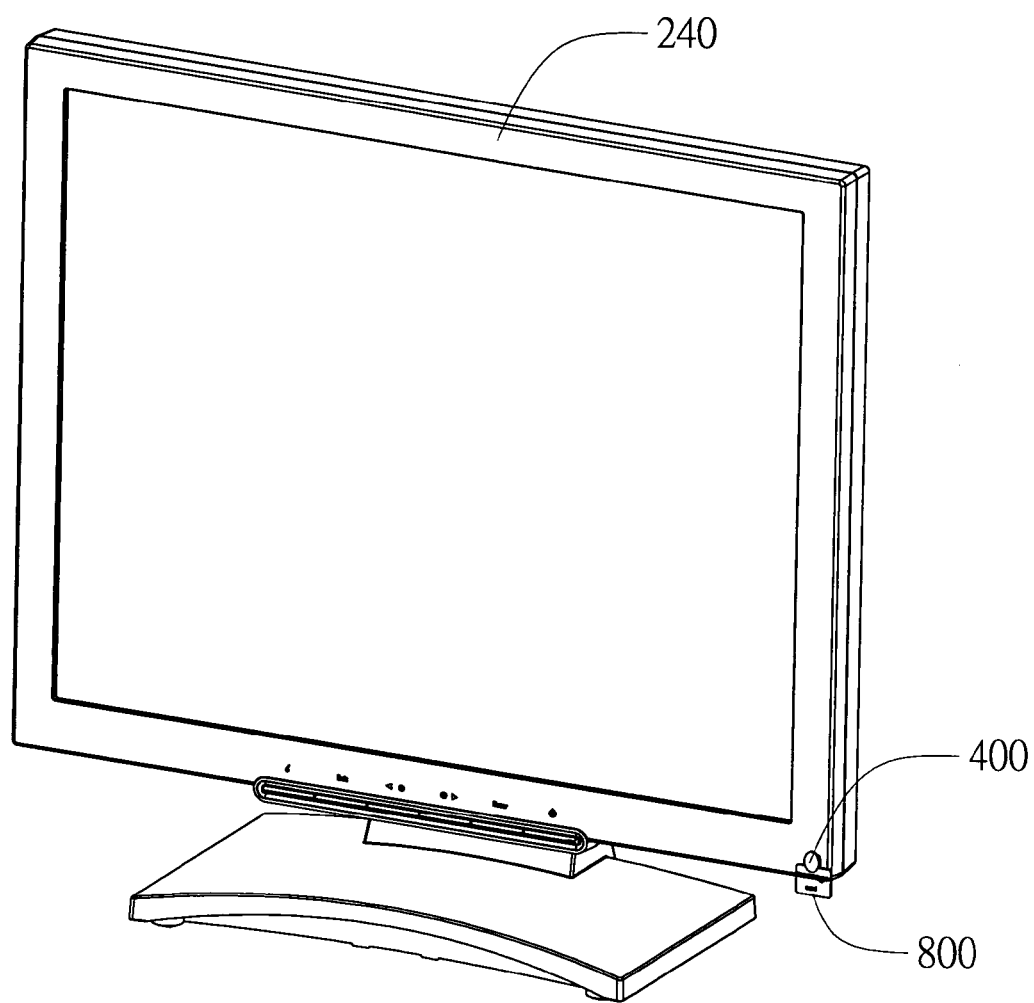
FIG. 4 illustrates the object positioned at the display device in FIG. 1.

Referring to FIG. 4, the object positioned at the display device in FIG. 1 is illustrated. To summarize, the components of the display device 100 cooperate with one another, so that the object 800 is positioned onto the shell 240 by the clamping element 400.

According to the shell and the display device using the same disclosed in the above embodiment of the present invention, the frame, the clamping element, the elastic element and the fastening element work together for positioning the object onto the shell. As a result, the shell and the display device using the same have additional functions, and an office worker can leave a message or a note easily.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A shell disposed at a display device, comprising:
a frame having a first surface, a second surface and a hole, wherein the first surface is opposite to the second surface, and the first surface and the second surface are penetrated by the hole;
a clamping element inserted into the hole, wherein an end of the clamping element is positioned at a side of the first surface, and the other end of the clamping element is positioned at a side of the second surface;
a fastening element disposed at the side of the second surface and connected to the clamping element; and
an elastic element for providing the clamping element with an elastic force toward the first surface.

2. The shell according to claim 1, wherein the clamping element has a body and a protruding column, the body is positioned at the side of the first surface of the frame, the protruding column protrudes from the body and is inserted into the hole, and a cross-sectional width of the body is larger than a cross-sectional width of the hole at least in one direction.

3. The shell according to claim 2, wherein the protruding column has a containing hole, an end of the fastening element is fastened in the containing hole, the other end of the fastening element has a block, and a cross-sectional width of the block is larger than a cross-sectional width of the hole at least in one direction.

4. The shell according to claim 3, wherein the containing hole has an internal thread surface, an end of the fastening element has an external thread surface, and the internal thread surface is connected to the external thread surface, so that the clamping element is coupled to the fastening element.

5. The shell according to claim 3, wherein the elastic element is a spiral spring surrounding the protruding column, an end of the spiral spring is disposed at the second surface, and the other end of the spiral spring is disposed at the fastening element.

6. The shell according to claim 2, wherein the protruding column is a prism.

7. The shell according to claim 2, wherein a cross-sectional shape of the hole corresponds to a cross-sectional shape of the protruding column of the clamping element.

8. The shell according to claim 2, wherein the body has a holding part for being held.

9. The shell according to claim 8, wherein the holding part is a recess at an edge of the body, and the recess faces the first surface.

10. The shell according to claim 2, wherein the hole and the protruding column of the clamping element respectively have a groove and a rib, and the rib is used for engaging with the groove to prevent the clamping element from rotating in the hole.

11. The shell according to claim 2, wherein the body is a flat plate to flatly contact the frame.

12. The shell according to claim 1, wherein the elastic element is at the side of the second surface, an end of the elastic element is disposed at the second surface, and the other end of the elastic element is disposed at the clamping element or the fastening element.

13. The shell according to claim 1, wherein a cross-sectional width of the clamping element and a cross-sectional width of the fastening element are larger than a cross-sectional width of the hole at least in one direction.

14. A display device, comprising:
a shell according to claim 1; and
a display element disposed in the shell.

15. A display device, comprising:
a shell comprising:
  a frame having a first surface, a second surface and a hole, wherein the first surface is opposite to the second surface, and the first surface and the second surface are penetrated by the hole;
  a clamping element inserted into the hole, wherein an end of the clamping element is positioned at a side of the first surface, and the other end of the clamping element is positioned at a side of the second surface;
  a fastening element disposed at the side of the second surface and connected to the clamping element; and
  an elastic element for providing the clamping element with an elastic force toward the first surface; and
a display element disposed in the shell.

16. The display device according to claim 15, wherein clamping element has a body and a protruding column, the body is positioned at the side of the first surface of the frame, the protruding column protrudes from the body and is inserted into the hole, and a cross-sectional width of the body is larger than a cross-sectional width of the hole at least in one direction.

17. The display device according to claim 16, wherein the protruding column has a containing hole, an end of the fastening element is fastened in the containing hole, the other end of the fastening element has a block, and a cross-sectional width of the block is larger than a cross-sectional width of the hole at least in one direction.

18. The display device according to claim 16, wherein the body has a holding part for being held.

19. The display device according to claim 16, wherein the hole and the protruding column of the clamping element respectively have a groove and a rib, and the rib is used for engaging with the groove to prevent the clamping element from rotating in the hole.

20. The display device according to claim 16, wherein the body is a flat plate to flatly contact the frame.

* * * * *